(12) United States Patent
Urata

(10) Patent No.: US 11,097,975 B2
(45) Date of Patent: Aug. 24, 2021

(54) APPARATUS FOR MANUFACTURING OPTICAL FIBER PREFORM

(71) Applicant: Shin-Etsu Chemical Co., Ltd., Tokyo (JP)

(72) Inventor: Yuhei Urata, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 346 days.

(21) Appl. No.: 16/361,235

(22) Filed: Mar. 22, 2019

(65) Prior Publication Data
US 2019/0292087 A1    Sep. 26, 2019

(30) Foreign Application Priority Data

Mar. 22, 2018  (JP) .............................. JP2018-053792

(51) Int. Cl.
*C03B 37/014*    (2006.01)
*C03B 37/012*    (2006.01)

(52) U.S. Cl.
CPC ........ *C03B 37/012* (2013.01); *C03B 2207/42* (2013.01)

(58) Field of Classification Search
CPC .............. C03B 37/012; C03B 37/014; C03B 37/01406; C03B 37/01413; C03B 37/0142; C03B 2207/40; C03B 2207/42
See application file for complete search history.

(56) References Cited

U.S. PATENT DOCUMENTS

| | | | | |
|---|---|---|---|---|
| 6,497,118 B1* | 12/2002 | Schermerhorn | .... | C03B 19/1407 431/160 |
| 6,588,230 B1* | 7/2003 | Adler | .................. | C03B 19/1407 239/416 |
| 6,619,074 B1* | 9/2003 | Wada | ................ | C03B 37/01406 65/27 |
| 2015/0336839 A1* | 11/2015 | Bookbinder | ...... | C03B 37/01815 65/414 |
| 2016/0176749 A1* | 6/2016 | Terashima | .......... | C03B 37/0142 65/421 |

FOREIGN PATENT DOCUMENTS

| | | | | | |
|---|---|---|---|---|---|
| DE | 102011107536 A1 | * | 10/2012 | ............. | B23K 10/00 |
| JP | 57095841 A | * | 6/1982 | ......... | C03B 37/0142 |
| JP | 05186237 A | * | 7/1993 | ......... | C03B 37/0142 |
| JP | 2001019439 A | * | 1/2001 | ......... | C03B 37/01406 |
| JP | 2012062203 A | * | 3/2012 | ......... | C03B 37/01406 |
| JP | 2014009142 A | * | 1/2014 | ......... | C03B 37/01208 |

* cited by examiner

*Primary Examiner* — Cynthia Szewczyk

(57) ABSTRACT

An optical fiber preform manufacturing apparatus comprising a seal member, wherein the seal member is attached to a flange portion formed in an open portion of a reaction chamber into which a burner is inserted, the seal member includes a first sheet that is flexible and includes an open portion that is smaller than an outer diameter of the burner, through which the burner is inserted; a second sheet having the same thickness as the first sheet and including an open portion that is larger than an outer diameter of the first sheet; and two third sheets that each include an open portion that is larger than the outer diameter of the burner and smaller than the outer diameter of the first sheet, the second sheet is arranged in the same plane as the first sheet, and the first and second sheets are sandwiched by the two third sheets.

8 Claims, 7 Drawing Sheets

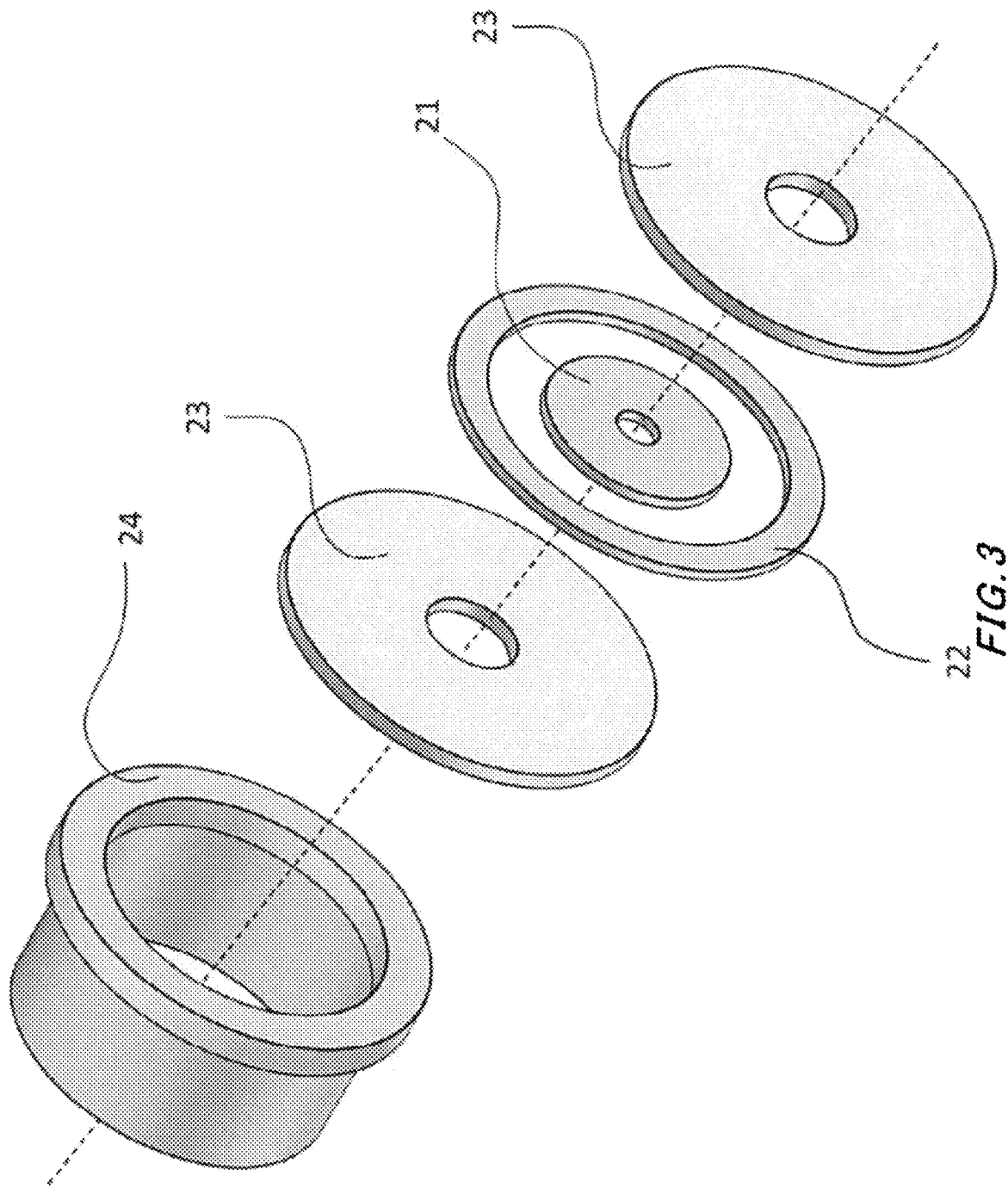

APPARATUS FOR MANUFACTURING OPTICAL FIBER PREFORM

The contents of the following Japanese patent application are incorporated herein by reference:
NO. 2018-053792 filed in JP on Mar. 22, 2018.

BACKGROUND

1. Technical Field

The present invention relates to an optical fiber preform manufacturing apparatus that forms an optical fiber preform by depositing glass microparticles on a starting member using VAD or the like.

2. Related Art

Manufacturing methods of a glass microparticle deposition body serving as an optical fiber preform include a method of spouting glass raw material gas from a tip of a burner inserted inside a reaction chamber to cause a reaction that generates glass microparticles, and depositing these glass microparticles on a starting member.

For example, when performing manufacturing according to VAD using an apparatus such as shown in FIG. 1, a starting member (target) 12 that moves upward while rotating is arranged inside a reaction chamber 11. A burner 13 is inserted into the reaction chamber 11. A burner formed by multiple cylindrical tubes arranged coaxially, for example, is used as the burner 13, and in respective regions partitioned by the tubes, a flammable gas such as hydrogen, a combustion supporting gas such as oxygen, a glass raw material such as silicon tetrachloride gas, and a dopant for adjusting the refractive index of glass such as germanium tetrachloride gas are supplied.

In the burner flame, the glass raw material causes a thermal oxidation reaction and a hydrolysis reaction, thereby generating glass microparticles made from silicon dioxide and germanium dioxide. While moving the starting member 12 upward, the glass microparticles spouted from the tip of the burner 13 are deposited on the starting member 12, thereby forming a glass microparticle deposition body (soot body) 14 shaped as a cylindrical pillar. The glass microparticle deposition body manufactured in this manner is heated in a sintering apparatus, thereby softening and melting the glass microparticles to form the transparent optical fiber preform. The optical fiber preform obtained in this manner is stretched (drawn) by being heated and melted by a drawing apparatus, thereby forming optical fiber.

The burner 13 is attached to the outside of the reaction chamber via a fine movement stage or the like. The fine movement stage of the burner 13 is used to adjust the position and angle of the burner during the manufacturing of the glass microparticle deposition body and between manufacturing batches, in order to control the shape of the glass microparticle deposition body and control the shape of the refractive index distribution of the optical fiber preform. There are cases where an open portion 15 of the reaction chamber 11 is larger than the outer diameter of the burner 13, to allow for positional adjustment of the burner 13, and a gap is provided between the burner 13 and the reaction chamber 11.

There are cases where outside atmosphere is drawn into the reaction chamber through the gap between the burner and the reaction chamber at the open portion, and foreign matter floating in this outside atmosphere is mixed into the glass microparticle deposition body. Such foreign matter causes air bubbles when the deposition body is sintered, and these air bubbles remain in the transparent glass preform after the sintering.

The present invention provides an optical fiber preform manufacturing apparatus that eliminates the gap between the burner and the reaction chamber at the open portion, thereby preventing outside atmosphere from entering into the reaction chamber.

SUMMARY

The present invention solves the above problem, and a first invention is an optical fiber preform manufacturing apparatus comprising a seal member, wherein the seal member is attached to a flange portion formed in an open portion of a reaction chamber into which a burner is inserted, the seal member includes a first sheet that is flexible and includes an open portion that is smaller than an outer diameter of the burner, through which the burner is inserted; a second sheet having the same thickness as the first sheet and including an open portion that is larger than an outer diameter of the first sheet; and two third sheets that each include an open portion that is larger than the outer diameter of the burner and smaller than the outer diameter of the first sheet, the second sheet is arranged in the same plane as the first sheet without contacting the first sheet, the first sheet and the second sheet are sandwiched by the two third sheets, and the optical fiber preform manufacturing apparatus has the burner inserted into the reaction chamber through the open portion of the seal member to generate and deposit glass microparticles.

A second invention is an optical fiber preform manufacturing apparatus comprising a seal member, wherein the seal member is attached to a flange portion formed in an open portion of a reaction chamber into which a burner is inserted, the seal member includes a first sheet that is flexible and includes an open portion that is smaller than an outer diameter of a cover for the burner, through which the cover is inserted; a second sheet having the same thickness as the first sheet and including an open portion that is larger than an outer diameter of the first sheet; and two third sheets that each include an open portion that is larger than the outer diameter of the cover for the burner and smaller than the outer diameter of the first sheet, the second sheet is arranged in the same plane as the first sheet without contacting the first sheet, the first sheet and the second sheet are sandwiched by the two third sheets, and the optical fiber preform manufacturing apparatus has the burner with the cover for the burner attached thereto inserted into the reaction chamber through the open portion of the seal member to generate and deposit glass microparticles.

According to the optical fiber preform manufacturing apparatus of the present invention, by inserting the burner into the reaction chamber through the open portion of the flexible seal member made from the plurality of sheets, it is possible to achieve beneficial effects such as eliminating the gap between the burner and the edge of the open portion in the reaction chamber to effectively prevent the intrusion of outside atmosphere into the reaction chamber, while preserving the region in which the inserted burner can move.

BRIEF DESCRIPTION OF THE DRAWINGS

FIG. 3 is a schematic perspective view for describing the arrangement of the first sheet, the second sheet, and the third sheets in the open portion of the reaction chamber according to a first embodiment example.

FIG. 4A shows a case in which the burner position is arranged at the centers of the second sheet and the third sheets, and FIG. 4B shows a case where the insertion position of the burner has been moved to the left.

FIG. 6A shows a case in which the burner position is arranged at the centers of the second sheet and the third sheets, and FIG. 6B shows a case where the insertion position of the burner has been moved downward.

DESCRIPTION OF EXEMPLARY EMBODIMENTS

Figure 1:
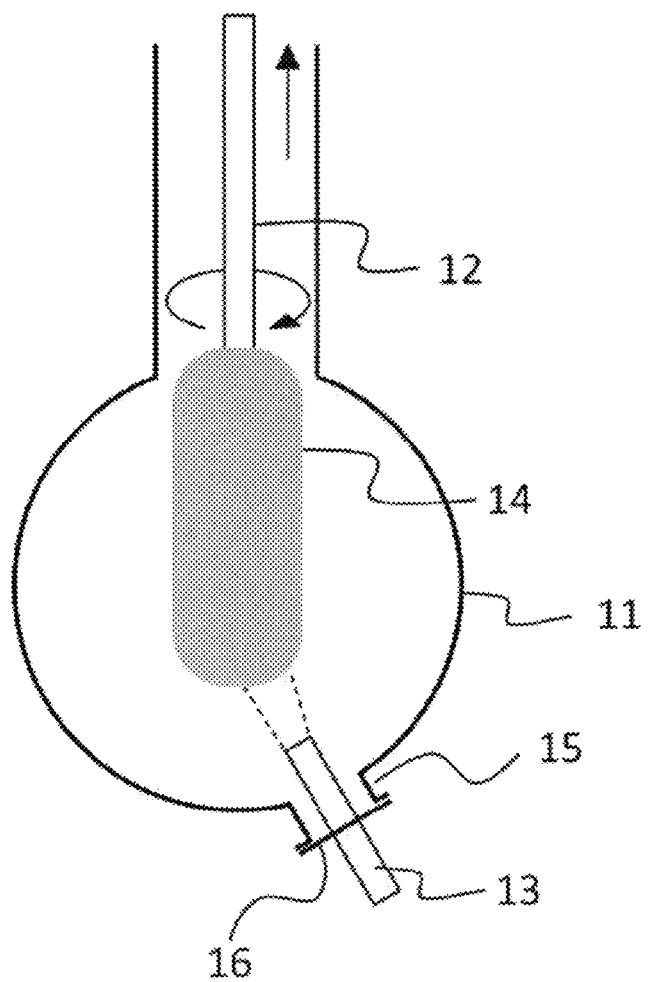
FIG. 1 is a schematic view for describing a glass microparticle deposition body manufacturing apparatus using VAD.
Figure 2:
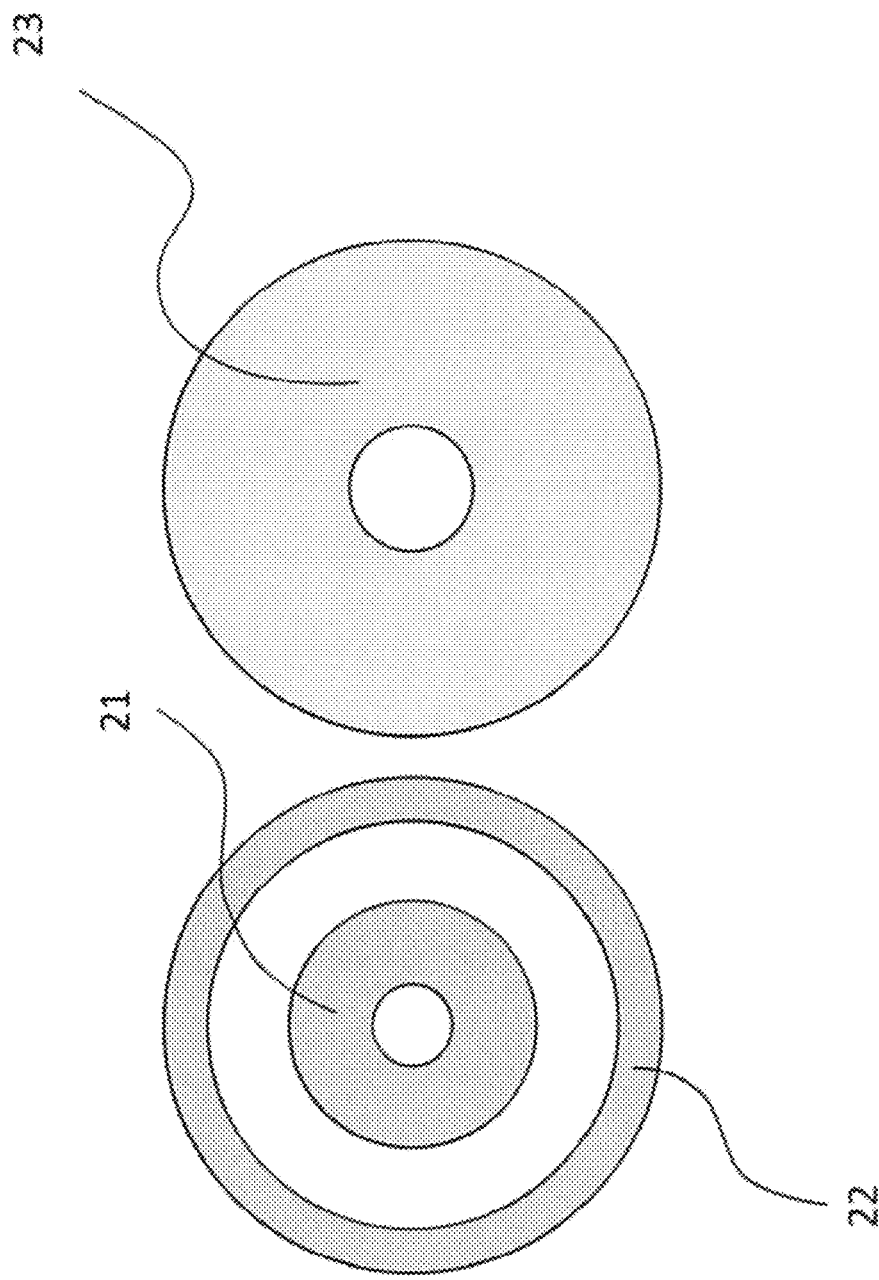
FIG. 2 is a schematic planar view for describing the shapes of the first sheet, the second sheet, and the third sheets used in the present invention.

As shown in FIGS. 2 and 3, a seal member used by the optical fiber preform manufacturing apparatus of the present invention includes a first sheet 21 having an open portion with an inner diameter equal to or slightly less than an outer diameter of a burner; a second sheet 22 that has the same thickness as the first sheet 21 and an open portion that is larger than the outer diameter of the first sheet, has a peripheral shape that is the same circular shape as a flange portion 24 formed in the open portion of the reaction chamber, and is arranged in the same plane as the first sheet 21; and third sheets 23 that each have an open portion that is smaller than the outer diameter of the first sheet 21 and larger than the outer diameter of the burner, each have a peripheral shape that is the same circular shape as the flange portion 24, and are arranged to sandwich the first sheet 21 and the second sheet 22. The burner is inserted into the open portion of the seal member formed by these four sheets, and the seal member is sandwiched by a clamp to be tightly secured to the flange portion 24.

Figure 4A:
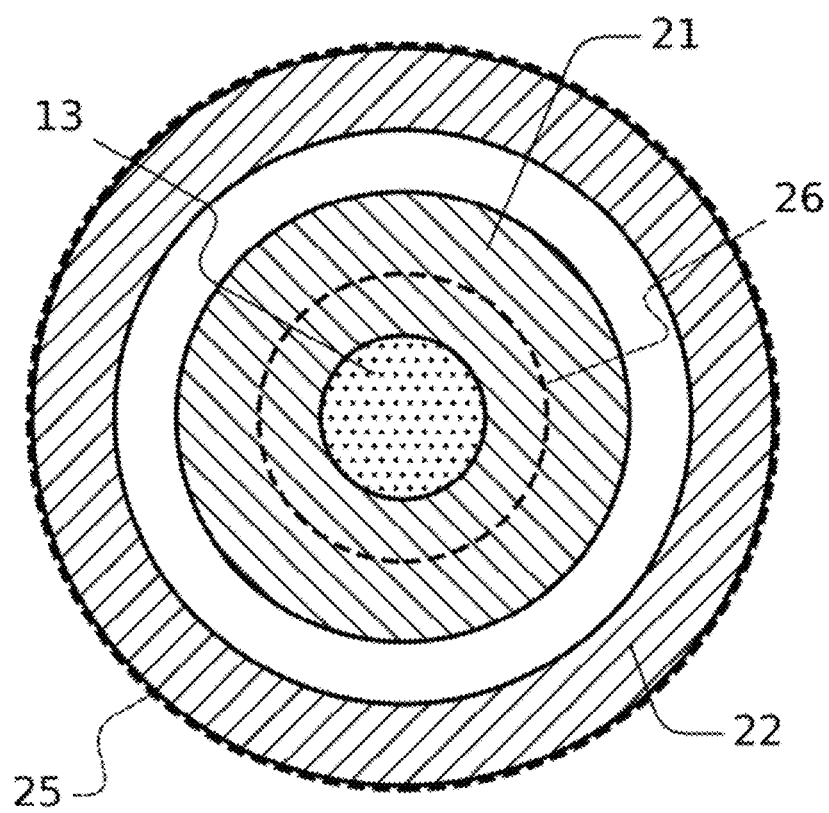
FIGS. 4A and 4B are schematic planar views for describing a state in which the first sheet, the second sheet, and the third sheets through which the burner has been inserted are attached to the flange in the open portion, according to the first embodiment example.
Figure 4B:
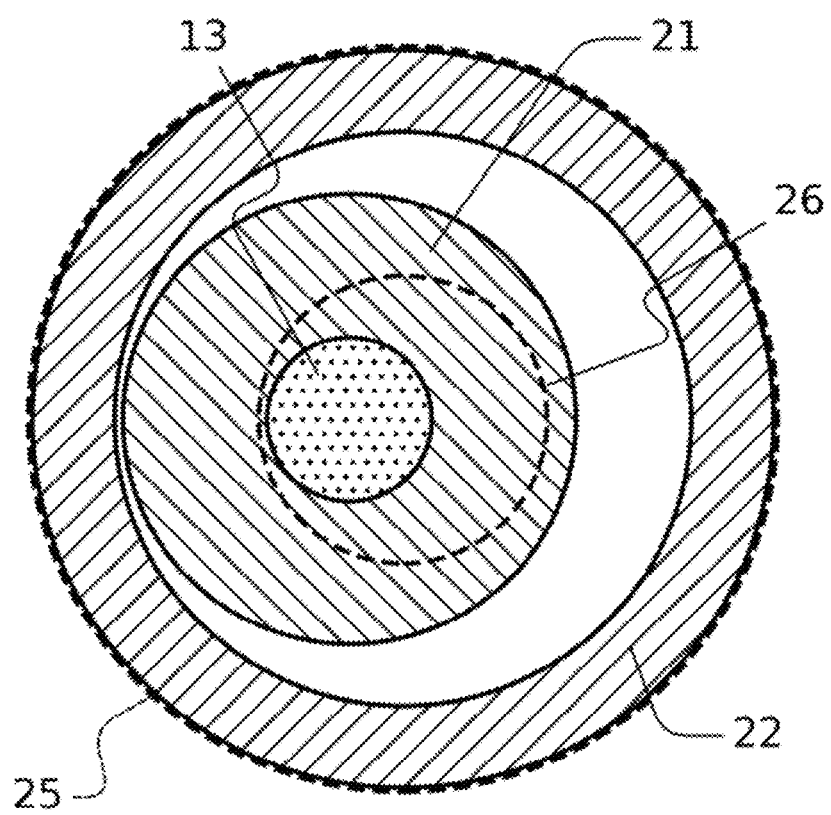
Figure 6A:
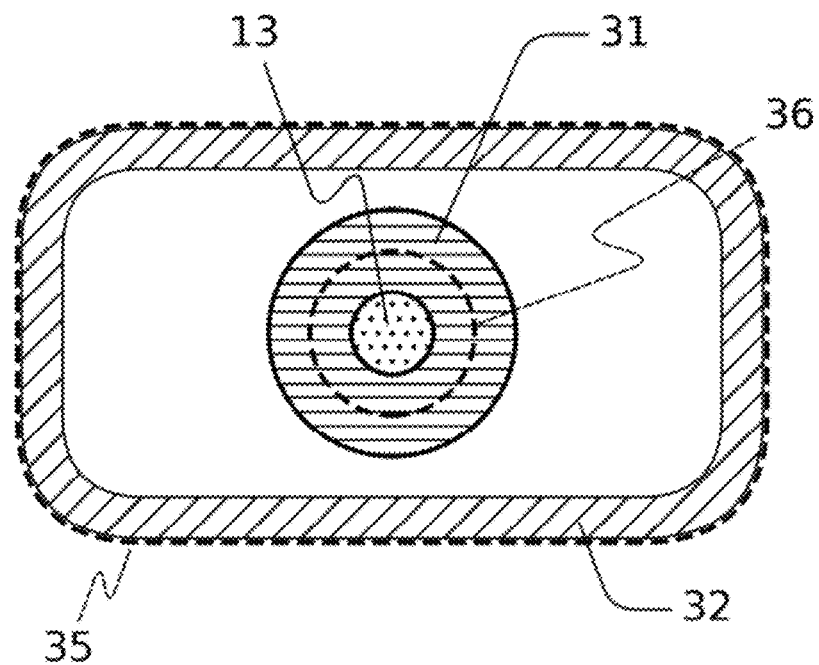
FIGS. 6A and 6B are schematic planar views for describing a state in which the first sheet, the second sheet, and the third sheets through which the burner has been inserted are attached to the flange in the open portion, according to the second embodiment example.
Figure 6B:
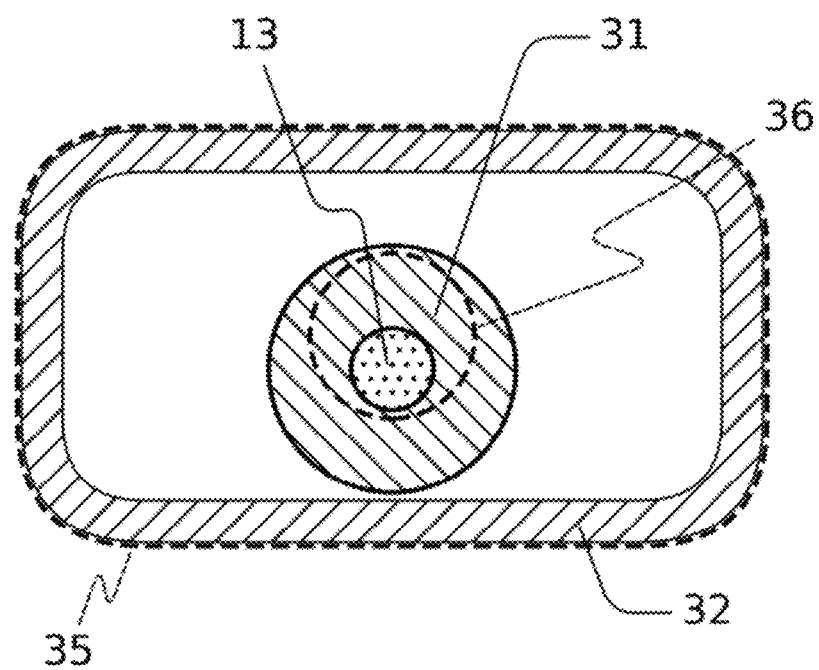

After this, when manufacturing conditions are changed in accordance with movement of the position of the burner, it is possible to change the burner position while maintaining separation between the inside and outside of the reaction chamber, as long as the burner position is in a range where the burner does not contact the edges of the open portions of the third sheets 23 and the outer circumferential portion of the first sheet 21 does not contact the inner circumferential portion of the second sheet 22, as shown in the examples of FIG. 4B and FIG. 6B, for example.

By using the manufacturing apparatus of the present invention in which the seal member is attached in the open portion of the reaction chamber in this manner, it is possible to prevent the outside atmosphere from entering into the reaction chamber through the open portion and, as a result, to prevent foreign matter floating in the outside atmosphere from mixing into the glass microparticle deposition body.

EMBODIMENT EXAMPLES

First Embodiment Example

A flange is provided protruding outward from the reaction chamber and having a width of 20 mm around a circular open portion with a radius of 70 mm. Accordingly, the flange has a circular shape with an outer radius of 90 mm. A flexible seal member having an open portion in the center thereof through which the burner is to be inserted was attached to this flange portion. The attachment of each sheet to the flange portion to form the seal member was performed as described below.

Each third sheet is made of PTFE resin with a thickness of 4 mm, has a circular shape with an outer radius of 90 mm, which is the same as the flange radius, and includes the open portion in the center thereof with a circular shape having a radius of 35 mm. The second sheet is made of silicone rubber with a thickness of 4 mm, has a circular shape with an outer radius of 90 mm, and includes the open portion in the center thereof with a circular shape having a radius of 70 mm. The first sheet is made of silicone rubber with a thickness of 4 mm, has a circular shape with an outer radius of 55 mm, and includes the open portion in the center thereof with a circular shape having a radius of 18 mm.

As shown in FIG. 3, these sheets are securely clamped to the flange 24 and stacked in the order of one third sheet 23, the second sheet 22, and the other third sheet 23, from the flange portion 24 in the open portion of the reaction chamber. The first sheet 21 is arranged within the open portion in the center of the second sheet 22, and is sandwiched by the third sheets 23 from the front and back. In this state, a burner with an outer radius of 20 mm was inserted through the open portion in the center of the first sheet 21.

FIGS. 4A and 4B are planar views of a state in which the first sheet 21, the second sheet 22, and the third sheets 23 through which the burner 13 has been inserted are attached to the flange 24, and the position of the flange contour 25 and the open portions 26 of the third sheets 23 are shown by dashed lines.

FIG. 4A shows a case in which the burner 13 has been inserted through the centers of the second sheet 22 and the third sheets 23, and FIG. 4B shows a case where the insertion position of the burner 13 has been moved to the left by 14 mm. In both cases, the entire open portion of the reaction chamber is covered by the seal member of the present invention, the outer circumference of the first sheet 21 does not contact the inner circumference of the open portion of the second sheet 22, and the burner 13 does not contact the inner circumferences of the open portions 26 of the third sheets 23. Therefore, it is possible to effectively prevent the intrusion of the outside atmosphere.

Second Embodiment Example

A flange is provided protruding outward from the reaction chamber and having a width of 20 mm around a rectangular open portion with a vertical length of 80 mm and a horizontal length of 160 mm. Accordingly, the flange has a rectangular shape with a vertical length of 120 mm and a horizontal length of 200 mm. A flexible seal member having an open portion in the center thereof through which the burner is to be inserted was attached to this flange portion.

The attachment of each sheet to the flange portion to form the seal member was performed as described below.

Each third sheet is made of PTFE resin with a thickness of 4 mm, has a periphery with a rectangular shape having a vertical length of 120 mm and a horizontal length of 200 mm, and includes the open portion in the center thereof with a circular shape having a radius of 20 mm. The second sheet is made of silicone rubber with a thickness of 4 mm, has a periphery with a rectangular shape having a vertical length of 120 mm and a horizontal length of 200 mm, and includes the open portion with the same dimensions as the open portion of the reaction chamber. The first sheet is made of silicone rubber with a thickness of 4 mm, has a circular shape with an outer radius of 30 mm, and includes the open portion in the center thereof with a circular shape having a radius of 9 mm.

Figure 5:
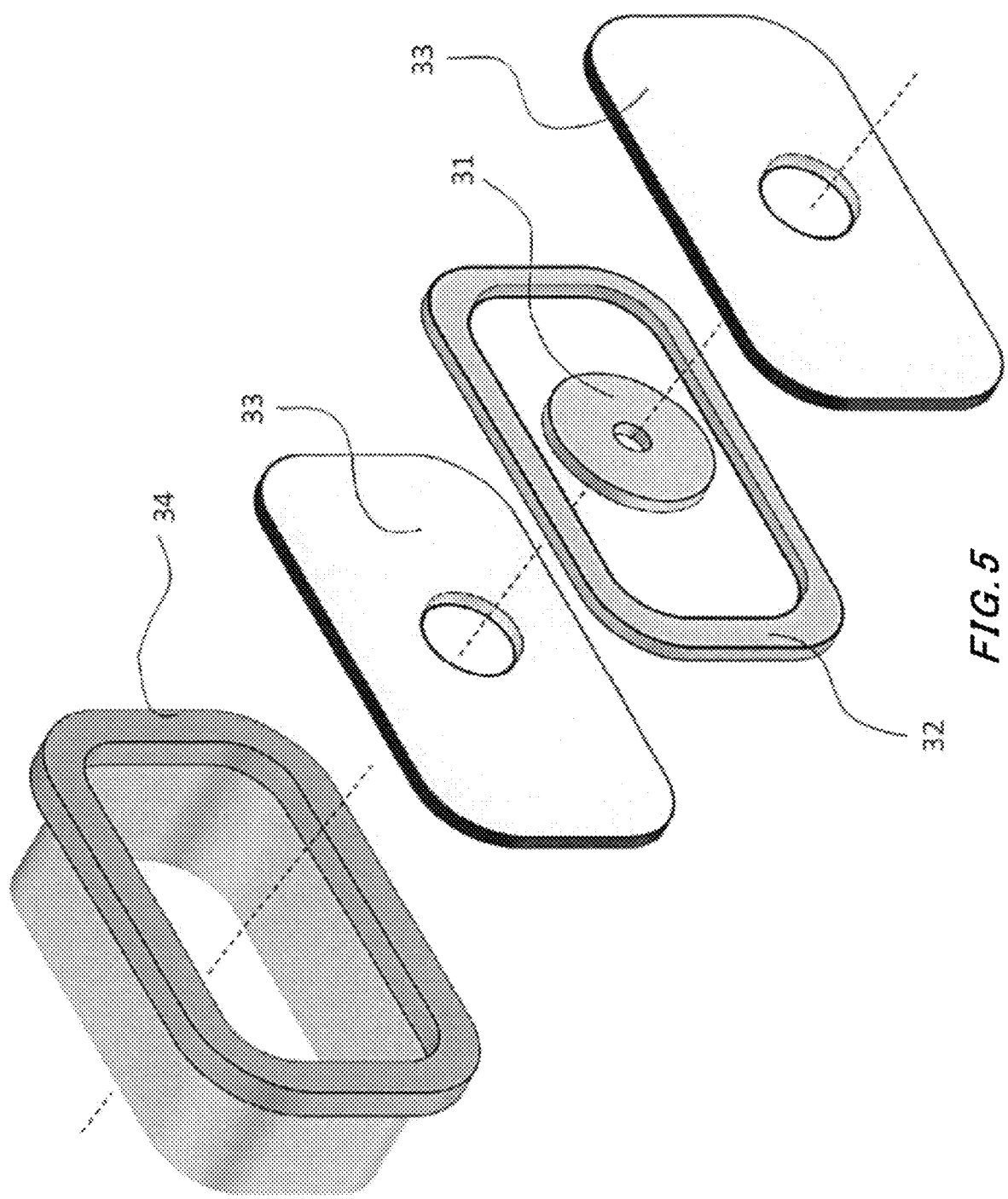
FIG. 5 is a schematic perspective view for describing the arrangement of the first sheet, the second sheet, and the third sheets in the open portion of the reaction chamber according to a second embodiment example.

As shown in FIG. 5, these sheets are securely clamped to the flange 34 and stacked in the order of one third sheet 33, the second sheet 32, and the other third sheet 33, from the flange 34 in the open portion of the reaction chamber. The first sheet 31 is arranged within the open portion in the center of the second sheet 32, and is sandwiched by the third sheets 33 from the front and back. In this state, a burner with an outer radius of 10 mm was inserted through the open portion in the center of the first sheet 31.

FIGS. 6A and 6B are planar views of a state in which the first sheet 31, the second sheet 32, and the third sheets 33 through which the burner 13 has been inserted are attached to the flange 34, and the position of the flange contour 35 and the open portions 36 of the third sheets 33 are shown by dashed lines.

FIG. 6A shows a case in which the burner 13 has been inserted through the centers of the second sheet 32 and the third sheets 33, and FIG. 6B shows a case where the insertion position of the burner 13 has been moved downward by 9 mm. In both cases, the entire open portion of the reaction chamber is covered by the seal member of the present invention, the outer circumference of the first sheet 31 does not contact the inner circumference of the open portion of the second sheet 32, and the burner 13 does not contact the inner circumferences of the open portions 36 of the third sheets 33. Therefore, it is possible to effectively prevent the intrusion of the outside atmosphere.

Third Embodiment Example

The first sheet used here is made from the same material and has the same outer shape as the first sheet used in the first embodiment example, but includes the open portion in the center thereof with a radius of 19 mm. The burner has an outer radius of 19 mm, and the tip of this burner has a cylindrical burner cover (hood) with an inner radius of 20 mm and an outer radius of 21 mm attached thereto. The burner cover and the burner were secured to each other by PTFE-type resin tape, without a gap therebetween. The shapes and sizes of the flange in the open portion of the reaction chamber, the second sheet, and the third sheets are the same as in the first embodiment example.

The seal member formed by these first, second, and third sheets was secured to the flange in the open portion of the reaction chamber, and the burner having the burner cover attached thereto was inserted through the open portion of the seal member. In this case as well, it was possible to effectively prevent intrusion of the outside atmosphere due to the movement for positional adjustment of the burner.

First Comparative Example

A flange was provided protruding outward from the reaction chamber and having a width of 20 mm around a circular open portion with a radius of 70 mm. Accordingly, the flange has a circular shape with an outer radius of 90 mm. A sheet made of silicone rubber with a thickness of 4 mm was prepared, having a circular outer circumference with a radius of 90 mm, which is the same as the flange contour, and including a circular open portion in the center thereof with a radius of 18 mm. A burner with an outer radius of 20 mm was inserted through the open portion in the center of this sheet, and the sheet was securely clamped to the flange.

It was possible to move the insertion position of the burner approximately 0.5 mm horizontally, by utilizing the flexibility of the silicone rubber sheet, but when the insertion position was moved by 1 mm or more, a gap occurred between the burner and the edge of the open portion in the center of the sheet, and outside atmosphere flowed into the reaction chamber.

What is claimed is:

1. An optical fiber preform manufacturing apparatus comprising a seal member, wherein
the seal member is attached to a flange portion formed in an open portion of a reaction chamber into which a burner is inserted,
the seal member includes:
a first sheet that is flexible and includes an open portion that is smaller than an outer diameter of the burner, through which the burner is inserted;
a second sheet having the same thickness as the first sheet and including an open portion that is larger than an outer diameter of the first sheet; and
two third sheets that each include an open portion that is larger than the outer diameter of the burner and smaller than the outer diameter of the first sheet,
the second sheet is arranged in the same plane as the first sheet without contacting the first sheet,
the first sheet and the second sheet are sandwiched by the two third sheets, and
the optical fiber preform manufacturing apparatus has the burner inserted into the reaction chamber through the open portion of the seal member to generate and deposit glass microparticles.

2. The optical fiber preform manufacturing apparatus according to claim 1, wherein
width of the open portion of each third sheet is greater than width of the open portion of the first sheet and less than a sum of width between an outer edge and an inner edge of the first sheet and the width of the open portion of the first sheet.

3. The optical fiber preform manufacturing apparatus according to claim 1, wherein
an outer edge of the first sheet is circular, and the open portion of the second sheet is circular.

4. The optical fiber preform manufacturing apparatus according to claim 1, wherein
an outer edge of the first sheet is circular, and the open portion of the second sheet is rectangular.

5. An optical fiber preform manufacturing apparatus comprising a seal member, wherein
the seal member is attached to a flange portion formed in an open portion of a reaction chamber into which a burner is inserted,
the seal member includes:
a first sheet that is flexible and includes an open portion that is smaller than an outer diameter of a cover for the burner, through which the cover is inserted;

a second sheet having the same thickness as the first sheet and including an open portion that is larger than an outer diameter of the first sheet; and two third sheets that each include an open portion that is larger than the outer diameter of the cover for the burner and smaller than the outer diameter of the first sheet, the second sheet is arranged in the same plane as the first sheet without contacting the first sheet, the first sheet and the second sheet are sandwiched by the two third sheets, and the optical fiber preform manufacturing apparatus has the burner with the cover for the burner attached thereto inserted into the reaction chamber through the open portion of the seal member to generate and deposit glass microparticles.

6. The optical fiber preform manufacturing apparatus according to claim 5, wherein width of the open portion of each third sheet is greater than width of the open portion of the first sheet and less than a sum of width between an outer edge and an inner edge of the first sheet and the width of the open portion of the first sheet.

7. The optical fiber preform manufacturing apparatus according to claim 5, wherein an outer edge of the first sheet is circular, and the open portion of the second sheet is circular.

8. The optical fiber preform manufacturing apparatus according to claim 5, wherein an outer edge of the first sheet is circular, and the open portion of the second sheet is rectangular.

\* \* \* \* \*